Feb. 8, 1944.  J. D. KENDALL  2,340,882
SENSITIZED PHOTOGRAPHIC MATERIALS
Original Filed Aug. 8, 1936  2 Sheets-Sheet 1
Fig. 1  UNSENSITIZED CONTROL EMULSION
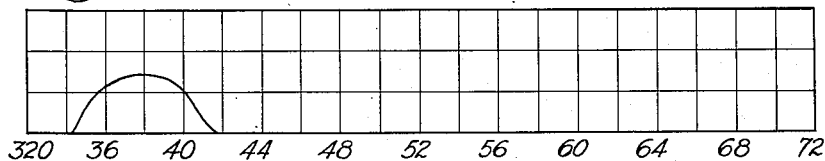
Fig. 2  EMULSION CONTAINING DYE OF EXAMPLE 34
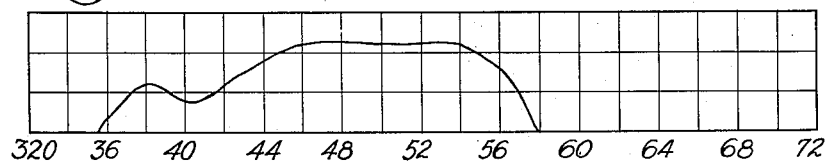
Fig. 3  EMULSION CONTAINING DYE OF EXAMPLE 35
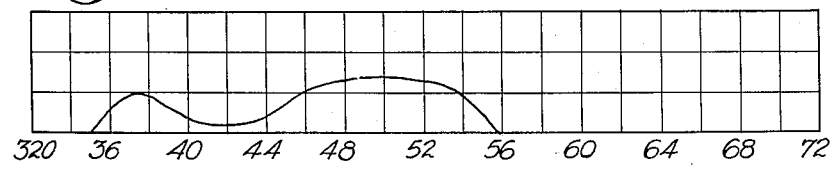
Fig. 4  EMULSION CONTAINING DYE OF EXAMPLE 36
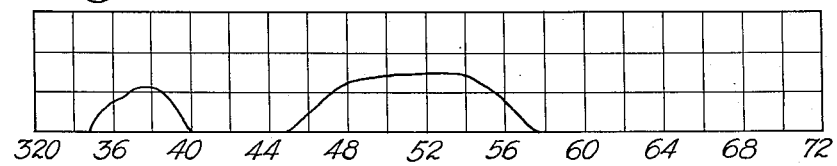
Fig. 5  EMULSION CONTAINING DYE OF EXAMPLE 37
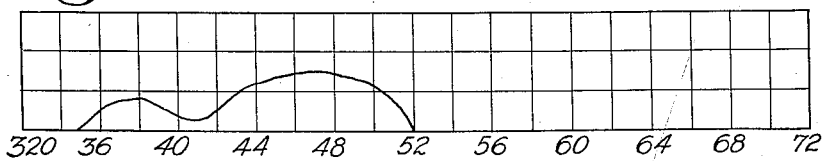
John David Kendall  INVENTOR.
BY Lynn B. Morris
ATTORNEY Feb. 8, 1944.    J. D. KENDALL    2,340,882
SENSITIZED PHOTOGRAPHIC MATERIALS
Original Filed Aug. 8, 1936    2 Sheets-Sheet 2
Fig. 6   EMULSION CONTAINING DYE OF EXAMPLE 38
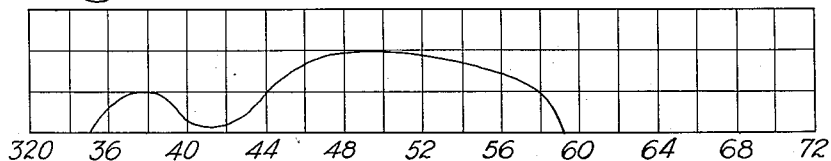
Fig. 7   EMULSION CONTAINING DYE OF EXAMPLE 39
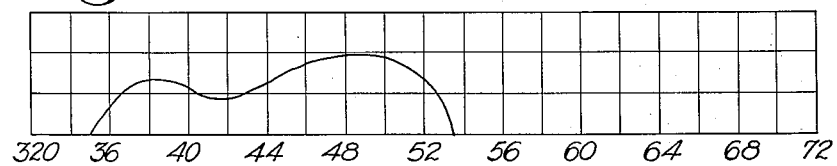
Fig. 8   EMULSION CONTAINING DYE OF EXAMPLE 40
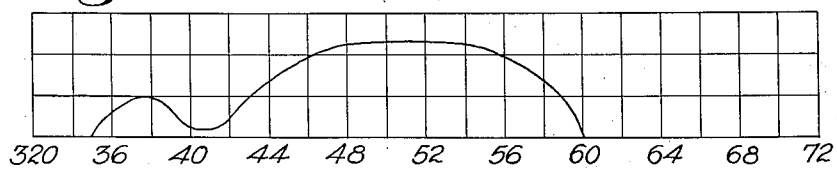
Fig. 9   EMULSION CONTAINING DYE OF EXAMPLE 41
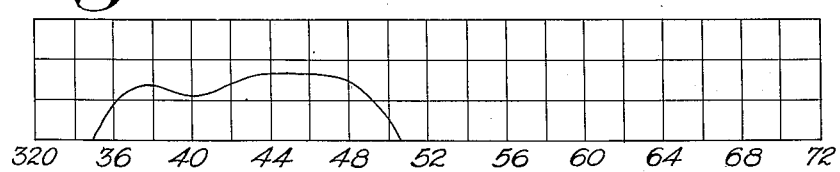
Fig. 10   EMULSION CONTAINING DYE OF EXAMPLE 43
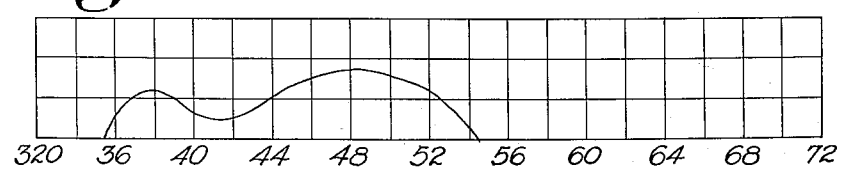
*John David Kendall* INVENTOR.
BY
*Lynn B. Morris*
ATTORNEY Patented Feb. 8, 1944

2,340,882

UNITED STATES PATENT OFFICE 2,340,882

SENSITIZED PHOTOGRAPHIC MATERIAL

John David Kendall, Ilford, England, assignor to Ilford Limited, Ilford, England, a British company Original application August 8, 1936, Serial No. 95,033. Divided and this application August 15, 1941, Serial No. 407,054. In Great Britain August 16, 1935

12 Claims. (Cl. 95—7)

This invention relates to the production of dyestuffs.

It is an object of this invention to produce compounds comprising two heterocyclic nitrogen nuclei linked by a chain of atoms including one or more nitrogen atoms. According to the present invention a process for the production of compounds of the above type comprises condensing a quaternary salt of a heterocyclic nitrogen compound containing a reactive thioether or selenoether group in the α or γ position to the nitrogen atom with ammonia or an amidine or the salt of one of these compounds.

The heterocyclic nitrogen compound whose quaternary salt is to be employed may consist of any one of the well-known heterocyclic nitrogen compounds such as substituted and unsubstituted thiazoles, thiazolines, oxazoles, oxazolines, selenazoles, selenazolines, pyridines, quinolines, indolenines, diazines, e. g., pyrimidines, thiodiazoles and quinazolines, and the corresponding polycyclic compounds such as benzthiazoles, naphthathiazole and anthrathiazole. The compound employed may be the quaternary salt of the thioether or selenoether derivative of the heterocyclic nitrogen compound, or it may be the salt obtained from the corresponding thione or selenone.

Whilst ammonia and the amidine may be employed as such, generally it is found more convenient to employ salts of these compounds, such as ammonium nitrate and acetamidine hydrochloride and to carry out the reaction in the presence of an acid binding agent; thus the reaction may be carried out in the presence of a solvent such as pyridine which also acts as an acid binding agent, or a neutral solvent such as alcohol may be employed together with a strong acid binding agent such as sodium ethoxide.

Further specific examples of the nitrogen compounds which may be employed are amidines such as formamidine, acetamidine, benzamidine, guanidine, urea, thiourea and O-alkyl pseudo ureas and S-alkyl pseudo thioureas.

The ammonia and amidine compounds which may be employed in accordance with the present invention may be expressed by one of the following general formulae:

NH$_2$—H or NH$_2$—CX=NH in which X represents any monovalent substituent, such as hydrogen, an alkyl, aryl or aralkyl group or a hydroxy, alkoxy, thiol, thioether, amino or substituted amino group. It will be observed that these compounds have replaceable hydrogen atoms attached to each of the nitrogen atoms, and when they are condensed with the heterocyclic nitrogen compounds, the replaceable hydrogen atoms react with the reactive groups of the heterocyclic nitrogen compound leaving the nitrogenous residue as the link between the heterocyclic nitrogen nuclei; thus it is believed that the reaction of the present invention may be illustrated by the following equations:

(1)
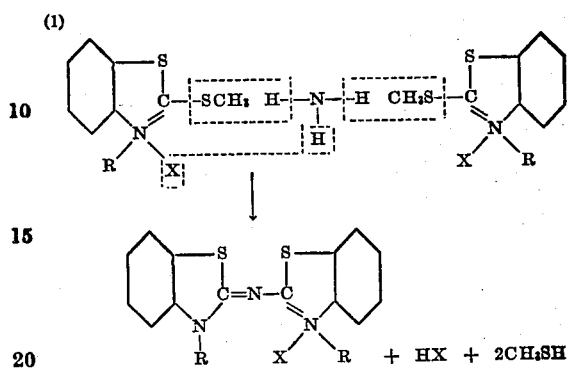

(2)
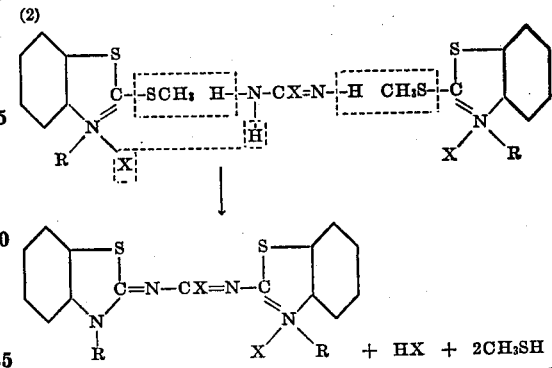

In the case of those amidines which readily break up to give ammonia it is believed that the reaction may follow the mechanism of the first equation to give a compound in which the linking chain consists only of a single nitrogen atom.

According to a modification of the process of the present invention, dyestuffs are obtained by condensing a quaternary salt of a heterocyclic nitrogen compound having a reactive thio-ether or seleno-ether group or a reactive amino-vinyl, acyl-amino-vinyl, aryl-amino-vinyl, or acyl-aryl-amino-vinyl grouping in the α or γ position to a nitrogen atom with an organic compound containing two amino groups linked by a single bond or by a conjugate chain of carbon atoms some or all of which form part of one or more aromatic carbo-cyclic rings, and which may be represented by the general formula

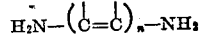

where $n$ is 0 or a positive integer, or salts of such compounds.

Examples of such compounds are:

hydrazine H$_2$N—NH$_2$ the o- and p-arylene diamine such as o- and p-phenylenediamines

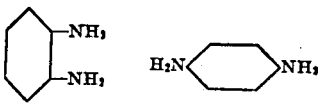

benzidine and its homologues such as dianisidine

diamino-stilbenes such as 2:2'-, 2:4'-, and 4:4'-diamino-stilbenes, e. g.

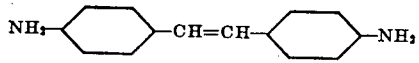

The reaction may be carried out in the presence of a solvent with or without an acid binding agent. When an acid binding agent is required, e. g. when using salts of these compounds, the reaction may be carried out in a neutral solvent such as alcohol together with an acid binding agent such as sodium ethoxide or sodium acetate, or it may be carried out in the presence of a basic solvent such as pyridine which acts the acid binding agent.

The quaternary salts of the same heterocyclic nitrogen compounds may be be employed in this modified process as in the process already described.

The hydrazine and other compounds are similar to ammonia and the amidines in having replaceable hydrogen atoms attached to the nitrogen atoms and it is believed that the mechanism of the reaction is similar in consequence and possibly may be illustrated by the following equations:

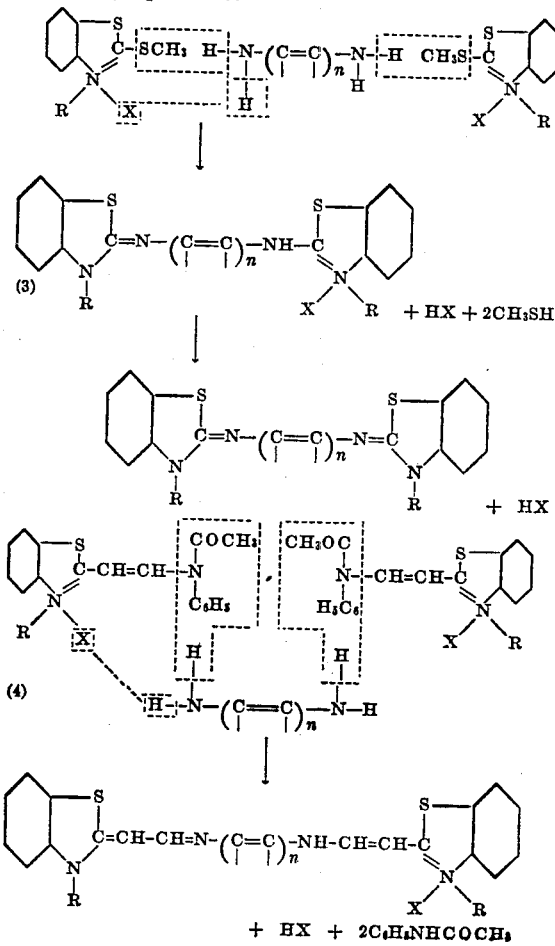

Many of the products of the present invention are coloured and are sensitisers for photographic silver halide emulsions. The dyestuffs obtained by the reaction of quaternary salts of heterocyclic nitrogen compounds having reactive aminovinyl or substituted aminovinyl groups with organic compounds such as hydrazine which may be represented by the formula

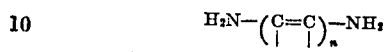

where $n$ is 0 or a positive integer are particularly good sensitisers, and the present invention includes a photographic silver halide emulsion sensitised with such a dyestuff.

One or more of the dyestuffs may be incorporated in the photographic silver halide emulsion before it is coated on a support, or alternatively the support (e. g. a film or plate) coated with the emulsion may be bathed in a solution of one or more of the dyestuffs. The actual quantity incorporated may vary to a certain extent with the individual dyestuff and with the ultimate effect which it is desired to obtain, as an indication, however, of the order of the quantities which may be employed, 100 ccs. of a one in one thousand solution of the dyestuff may be incorporated in six and a half litres of emulsion equivalent to about 250 grams of silver nitrate, or the coated support may be bathed in a one in one thousand solution of the dyestuff; the strength of the solution may vary according to the dyestuff used and may be as low as one in ten thousand.

The process of the present invention is illustrated by the following specific examples, several of which give an indication of the sensitising action of the products.

*Example 1*

2.23 grams of 1:3:3-trimethyl-2-ω-acetanilido-vinyl-indolenium iodide and 1.05 gms. of hydrazine hydrochloride were mixed with 20 ccs. of pyridine and the whole warmed on a water bath for about half an hour when an orange dye formed. The mixture was then gently boiled under a reflux condenser for about twenty minutes. The liquid obtained was then poured into aqueous potassium iodide solution when the dyestuff was precipitated out as a crimson solid and recrystallized from methyl alcohol to give a dye which decomposed at about 250° C. This dye is a very powerful senstiser for silver chloride emulsions and extends their sensitivity ranges to about 5900 A. with a flat sensitising curve over the range from about 4600 A. to about 5400 A. This dyestuff is a mono hydriodide salt of the dye base of the formula:

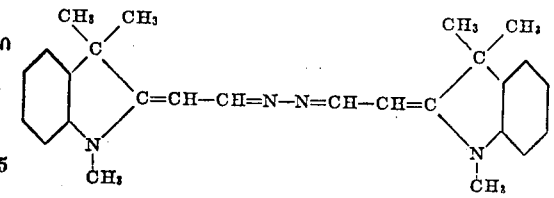

*Example 2*

22.3 grams of 1:3:3-trimethyl-2-ω-acetanilido-vinyl indelenium iodide and 9.05 grams of p-phenylenediamine hydrochloride and 200 ccs. of pyridine were mixed and heated together on a water bath for twenty-five minutes and then gently boiled under a reflux condenser for a further ten minutes. The orange solution obtained was then poured into water when small brickred crystals quickly settled out. These were filtered off, washed with spirit and ether and dried and melted at 272° C. This dyestuff is a dihydriodide salt of the dye base of the formula:

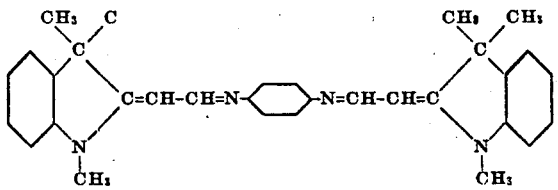

*Example 3*

11.2 grams of 1-ω-acetanilido-vinyl-benzthiazole ethiodide, 4.5 grams of p-phenylenediamine hydrochloride were mixed together with 300 ccs. of pyridine. The solids dissolved up and the solution became yellow in colour. The solution was then heated on a water bath for forty minutes, after which it was gently boiled under a reflux condenser for ten minutes, when a crimson solid separated out. The mixture was then poured into water and the crimson crystals which separated out were filtered off, washed and dried. They melted at 285° C. This dyestuff is a di-hydriodide salt of the dye base of the formula:

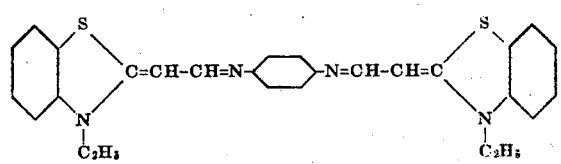

*Example 4*

21 grams of 1-ω-acetanilido-vinyl-benzoxazole methiodide and 9.05 grams of paraphenylenediamine hydrochloride were mixed with 100 ccs. of pyridine and gently boiled together. A deep yellow solution was obtained and orange coloured crystals were deposited from the hot solution. After allowing this solution to stand until cool the crystals were filtered off, washed and dried. They had a melting point higher than 305° C. This dyestuff is a di-hydriodide salt of the dye base of the formula:

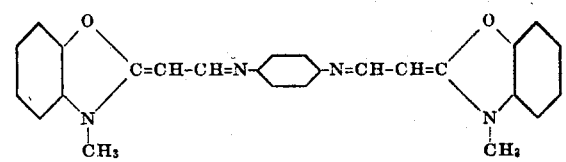

*Example 5*

11.2 grams of 1-ω-actanilido-vinyl-benzthiazole ethiodide and 2.7 grams of hydrazine dihydrochloride were mixed together with 100 ccs. of spirit and 4.1 grams of anhydrous sodium acetate. On gently warming the mixture a deep orange solution with a faint red tinge was obtained. This was diluted with water and brown crystals with a green reflex were deposited. These crystals were filtered off, washed and recrystallised from methyl alcohol and were found to melt at 226° C. with decomposition. This dyestuff is a monohydriodide salt of the dye base of the formula:

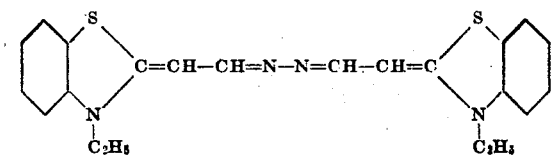

*Example 6*

22.3 grams of 1:3:3-trimethyl-2-ω-acetanilido-vinyl-indolenium iodide, 9.2 grams of benzidine and 150 ccs. of dry spirit were gently boiled together under a reflux condenser for 30 minutes. The substances dissolved in the spirit and then orange crystals with a bluish reflex separated from the hot solution. After cooling the solid was filtered off from the liquors and well washed with spirit and ether. The crystals melted above 300° C.

A further experiment showed that this reaction could be carried out equally well using pyridine in place of the alcohol. This dyestuff is a dihydriodide salt of the dye base of the formula:

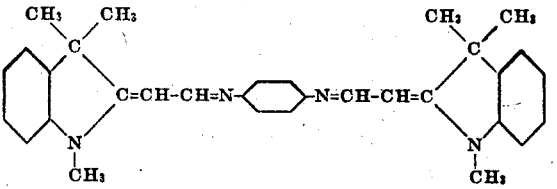

*Example 7*

22.5 grams of 1-ω-acetanilido-vinyl-benzthiazole ethiodide and 9.2 grams of benzidine were mixed together with 200 ccs. of dry spirit and the whole gently boiled for 30 minutes. A brown crystalline solid separated out, which was filtered off, washed and dried and obtained as dark brown crystals melting at 260° C. This dyestuff is a di-hydriodide salt of the dye base of the formula:

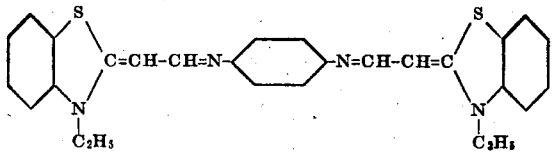

*Example 8*

21 grams of 1-ω-acetanilido-vinyl-benzoxazole methiodide and 9.2 grams of benzidine were mixed together with 100 ccs. of alcohol and the whole gently heated for a few minutes. An intense yellow solution was obtained from which small orange crystals separated out. These were filtered off and washed and dried and obtained as orange yellow powder having a melting point above 300° C. This dyestuff is a di-hydriodide salt of the dye base of the formula:

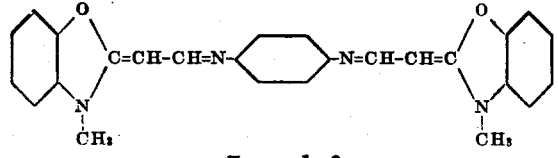

*Example 9*

18.1 grams of 1-methylthiol benzthiazole were heated together with 18.6 grams of methyl-p-toluene sulphonate for three and a half hours at 130–140° C. 18.4 grams of benzidine and 200 ccs. of spirit were added and the mixture was gently warmed for twenty minutes when a light yellow solid was deposited and mercaptan evolved. The solid was filtered off, well washed with benzene spirit and ether and obtained as almost colourless powder melting above 300° C.

*Example 10*

22.3 grams of 1:3:3-trimethyl-2-ω-acetanilido-vinyl indolenium iodide, 12.2 grams of di-anisidine (2:2'-dimethoxy benzidine) and 100 ccs. of pyridine were mixed together and gently boiled under a reflux condenser for thirty minutes. A deep orange solution was obtained from which a brick red solid was deposited on cooling. This solid was filtered off, well washed and obtained as small brick red crystals, melting at 282° C. with decomposition. This dyestuff is a di-hydriodide salt of the dye base of the formula:

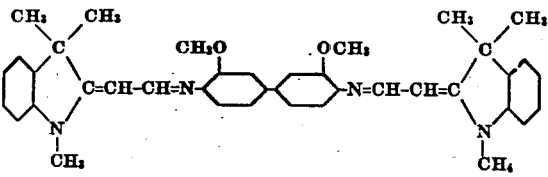

This application is a division of applicant's copending application Serial No. 95,033, filed August 8, 1936, now U. S. Patent 2,307,049.

In the accompanying drawings the sensitivity curves of Figures 1–10 are those of an unsensitized control emulsion and an emulsion containing the dyes of Examples 1 to 8, inclusive, and 10, respectively.

What I claim is:

1. A photographic emulsion containing a dyestuff of the general formula:

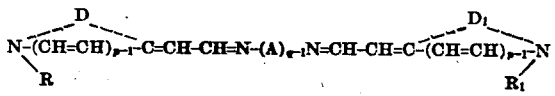

wherein D and $D_1$ are the residues of heterocyclic nitrogen compounds of the type used in cyanine dyes, R and $R_1$ are alkyl groups, $p$ is a positive integer not greater than 2, $q$ is a positive integer not greater than 2 and A is a chain of an even number of carbon atoms not exceeding 10 alternately doubly and singly bonded, the carbon atoms of A directly linked to the nitrogen atoms each forming with the next adjacent carbon atom in the chain part of a carbocyclic nucleus, and the acid salts of such dyestuffs wherein a salt group is attached to a nitrogen atom rendering such atom pentavalent.

2. A photographic emulsion containing an acid salt of a dyestuff of the general formula and having the characteristics of the dyestuff set forth in claim 1.

3. A photographic emulsion containing a dyestuff of the general formula:

wherein D and $D_1$ are the residues of heterocyclic nitrogen compounds of the type used in cyanine dyes, R and $R_1$ are alkyl groups, $p$ is a positive integer not greater than 2, and $q$ is a positive integer, and the acid salts of such dyestuffs wherein a salt group is attached to a nitrogen atom rendering such atom pentavalent.

4. A photographic emulsion containing an acid salt of a dyestuff of the general formula and having the characteristics of the dyestuff set forth in claim 3.

5. A photographic emulsion containing a dyestuff of the general formula:

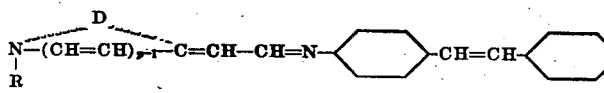

where D and $D_1$ are the residues of heterocyclic nitrogen compounds of the type used in cyanine dyes, R and $R_1$ are alkyl groups and $p$ is a positive integer not greater than 2, and the acid salts of such dyestuffs wherein a salt group is attached to a nitrogen atom rendering such atom pentavalent.

6. A photographic emulsion containing an acid salt of a dyestuff of the general formula and having the characteristics of the dyestuff set forth in claim 5.

7. A photographic emulsion containing a dyestuff of the general formula:

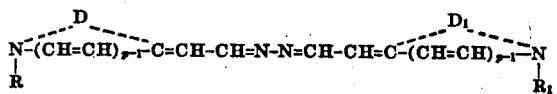

wherein D and $D_1$ are the residues of heterocyclic nitrogen compounds of the type used in cyanine dyes, R and $R_1$ are alkyl groups and $p$ is a positive integer not greater than 2, and the acid salts of such dyestuffs wherein a salt group is attached to a nitrogen atom rendering such atom pentavalent.

8. A photographic emulsion containing an acid salt of a dyestuff of the general formula and having the characteristics of the dyestuff set forth in claim 7.

9. A silver halide emulsion comprising a dye corresponding with the formula:

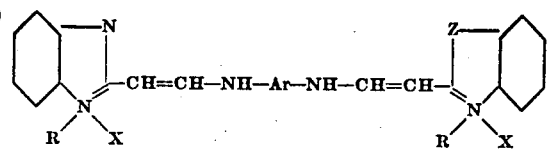

in which Y and Z stand for a member selected from the group consisting of S, Se, —CH=CH—, and

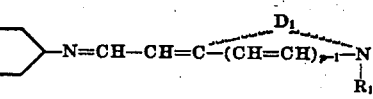

wherein $R_1$ and $R_2$ stand for alkyl groups, R stands for alkyl, Ar stands for an aromatic radical which contains at least one benzene nucleus but no more than two benzene nuclei, X stands for an anion capable of precipitating the dye.

10. A silver halide emulsion comprising a dye corresponding with the formula:

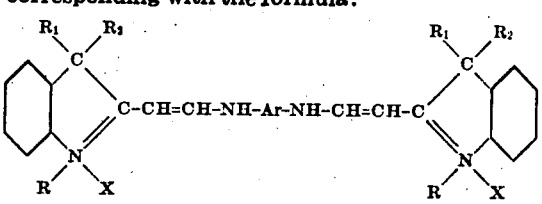

where $R_1$ and $R_2$ stand for alkyl groups, R stands for alkyl, Ar stands for an aromatic radical which contains at least one benzene nucleus but no more than two benzene nuclei, X stands for an anion capable of precipitating the dye.

11. A light sensitive silver halide emulsion containing a small amount of a mono-hydriodide salt of the dye base of the formula:
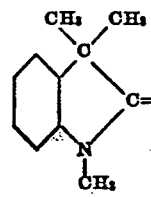
12. A light sensitive silver halide emulsion containing a small amount of a di-hydriodide salt of the dye base of the formula:
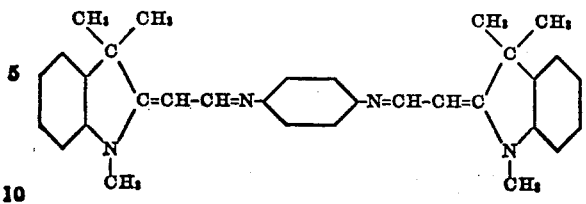
JOHN DAVID KENDALL.

Certificate of Correction

Patent No. 2,340,882.  February 8, 1944.

JOHN DAVID KENDALL

It is hereby certified that errors appear in the printed specification of the above numbered patent requiring correction as follows: Page 2, first column, line 25, after the word "acts" insert *as*; page 4, first column, line 14, for that portion of the formula reading "$CH_4$" read *$CH_3$*; and second column, line 31, claim 9, in the formula, for

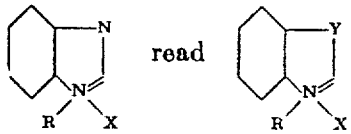

and that the said Letters Patent should be read with these corrections therein that the same may conform to the record of the case in the Patent Office.

Signed and sealed this 25th day of April, A. D. 1944.

[SEAL]

LESLIE FRAZER,
*Acting Commissioner of Patents.*